Nov. 13, 1962 A. GRAF 3,063,323
APPARATUS FOR PRODUCING SEPARATE SLIDE FASTENERS
FROM CONTINUOUS FASTENER CHAIN
Filed Sept. 26, 1956 3 Sheets-Sheet 2
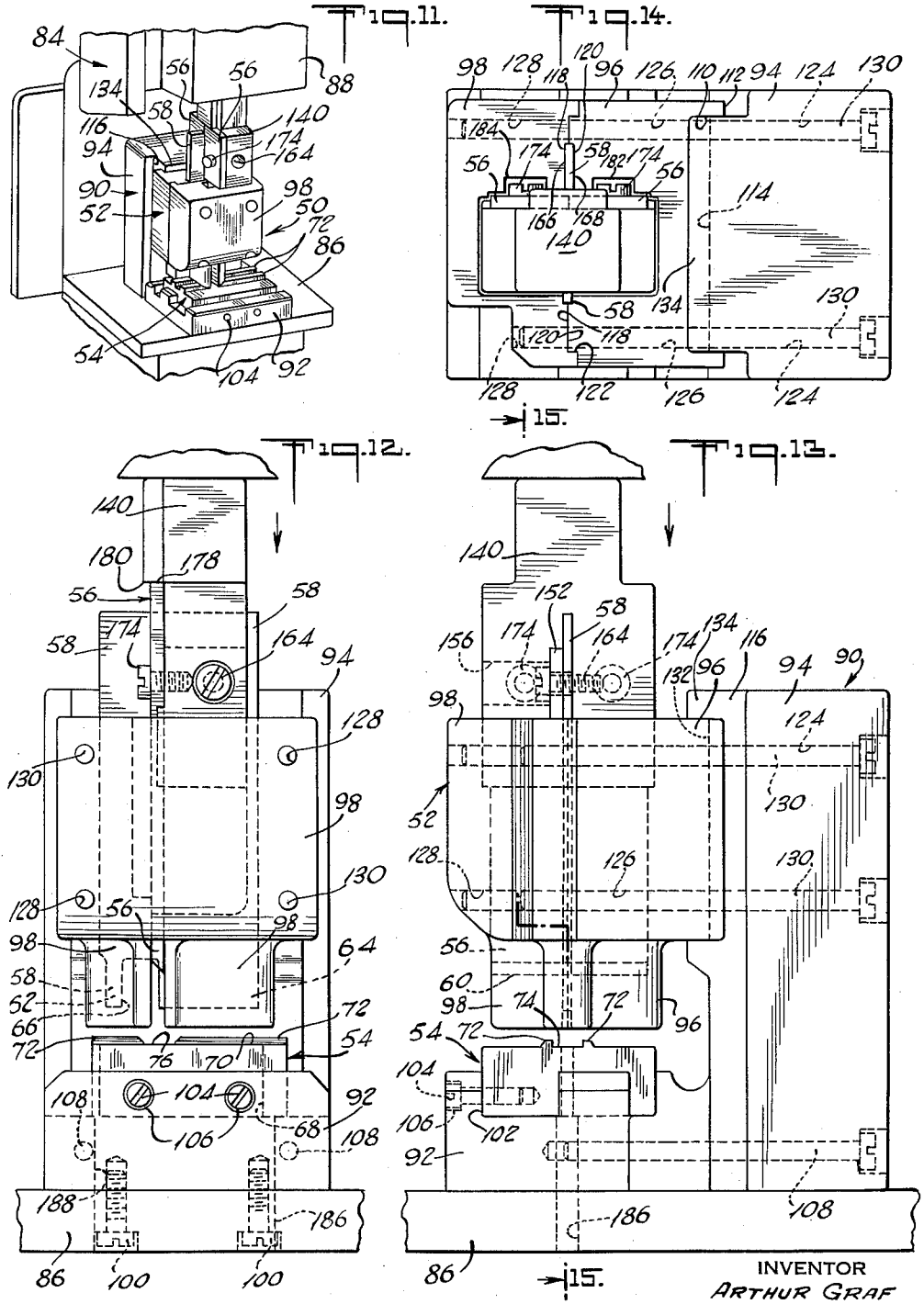
INVENTOR
ARTHUR GRAF
BY
ATTORNEY

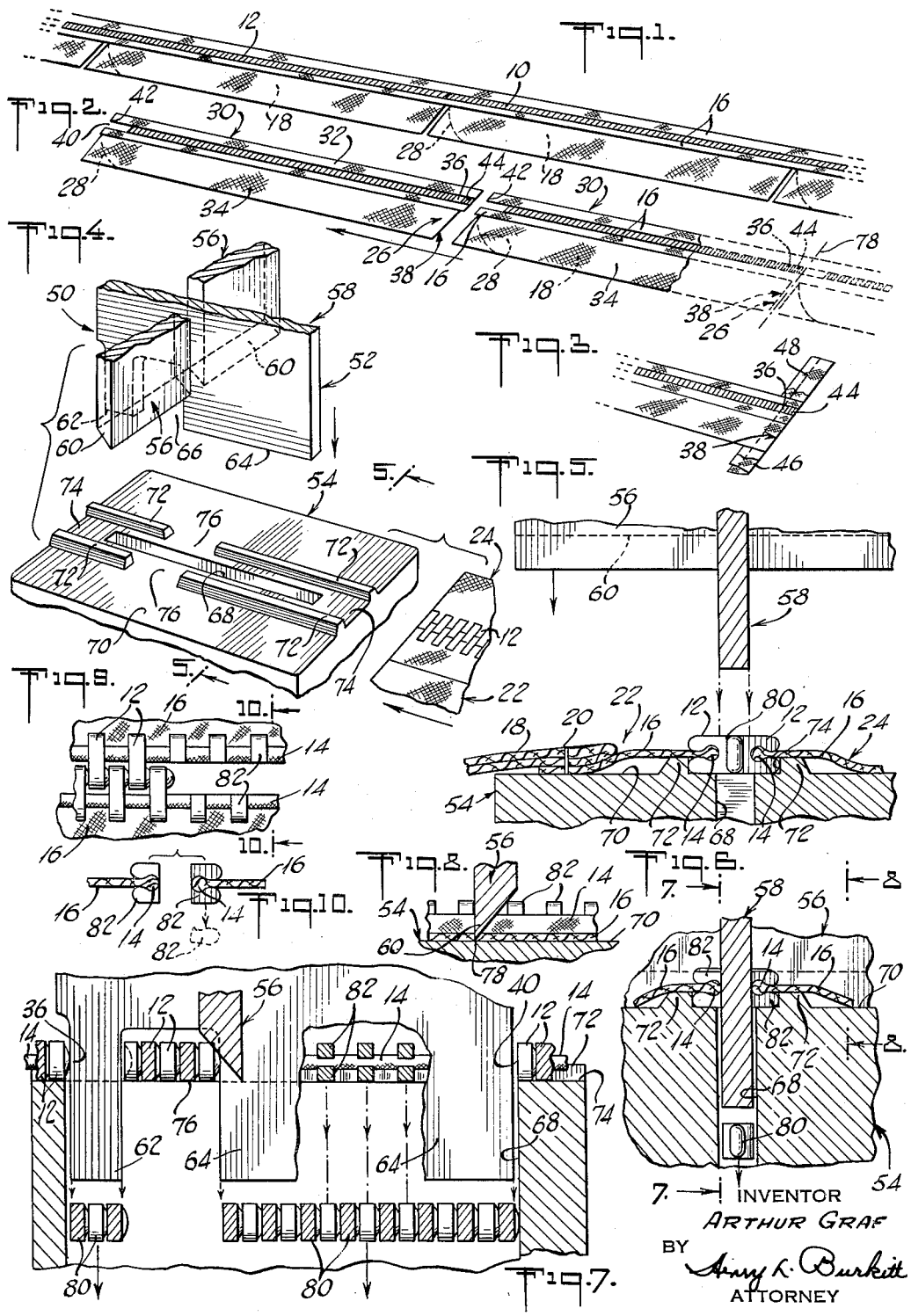

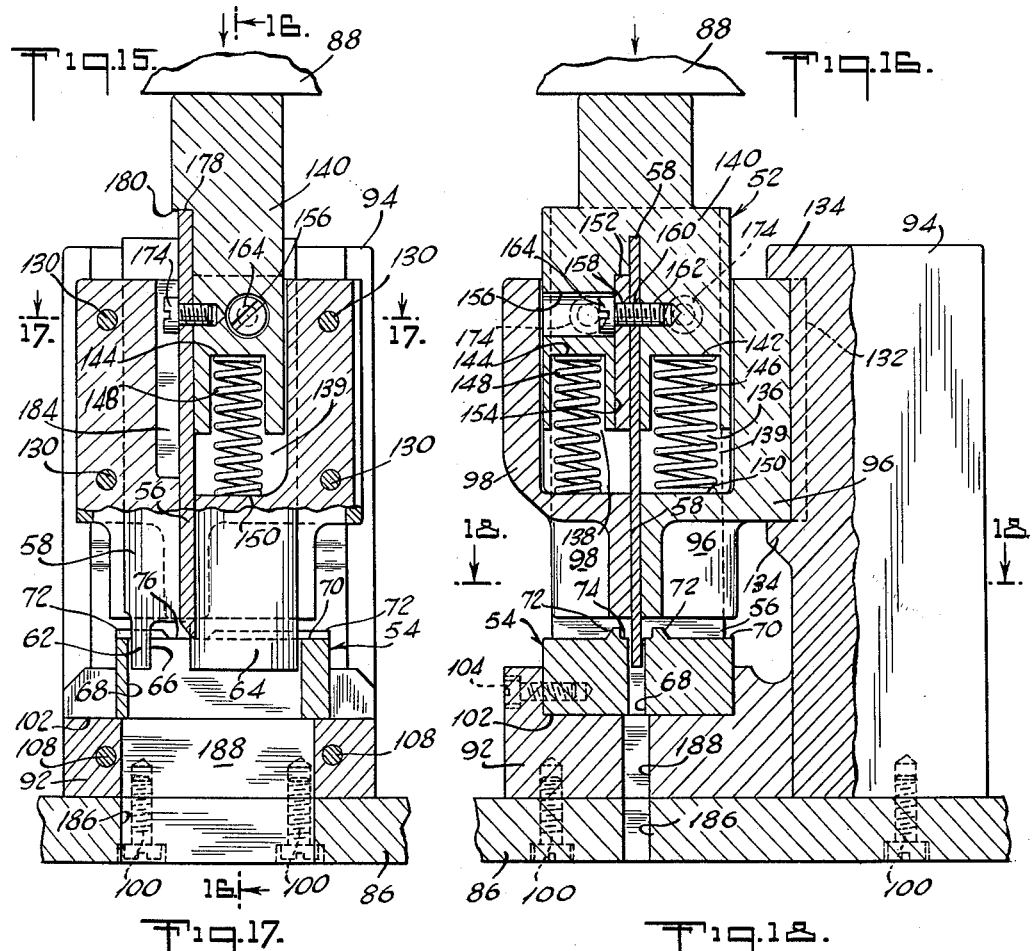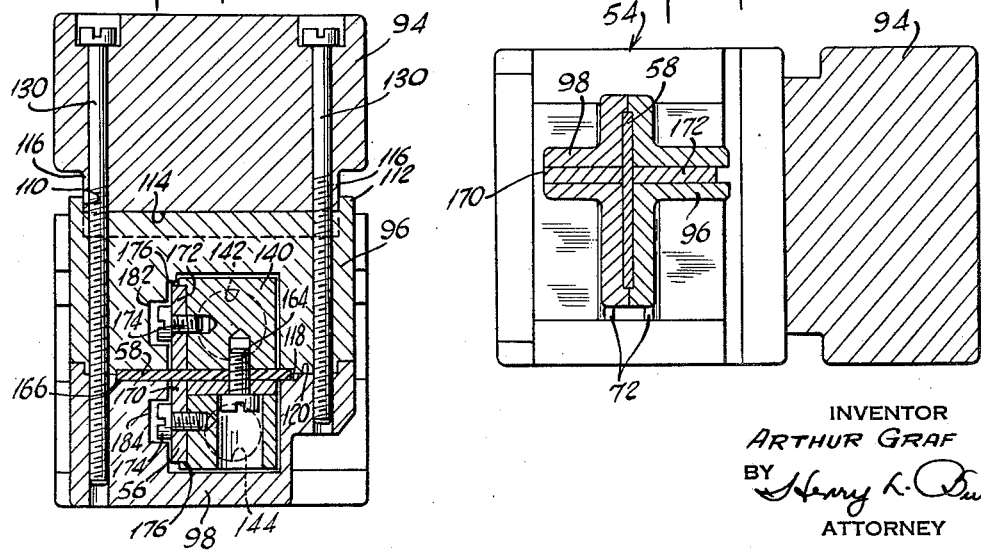

United States Patent Office 3,063,323
Patented Nov. 13, 1962

3,063,323
APPARATUS FOR PRODUCING SEPARATE SLIDE FASTENERS FROM CONTINUOUS FASTENER CHAIN
Arthur Graf, Far Rockaway, N.Y., assignor to Jet Industries Corporation, Brooklyn, N.Y., a corporation of New York
Filed Sept. 26, 1956, Ser. No. 612,159
4 Claims. (Cl. 83—622)

This invention relates generally to a method and apparatus for producing separate slide fasteners from continuous fastener chain.

An object of the invention is to simplify the steps in forming separate slide fasteners of predetermined length from continuous fastener chain. In one of its specific applications, the invention is concerned with the method of assembling slide fasteners at the fly openings of garments wherein fly pieces are attached to the continuous chain before separation of the slide fastener unit from the continuous fastener chain. Thus, on separation of a slide fastener unit, fly pieces and slide fastener are prepared for attachment to a garment. This results in reduction of the cost of manufacture of the garment. Under such circumstances continuous fastener chain to which each of a plurality of flies are attached in a series is severed in relation to the end edge of a fly. In that operation, certain fastener elements are cut from the chain to define the effective length of the fastener unit associated with the attached fly for its attachment to a garment.

Another object of the invention is to provide apparatus for separating continuous fastener chain into individual lengths or slide fasteners which are ready for attachment to a garment, wherein such apparatus is simple in design and construction, foolproof, reliable in operation, and is economical to manufacture.

Another object of the invention is to provide apparatus of the type indicated wherein means for cutting out the fastener elements is made readily interchangeable so that the extent and position of the elements to be removed in making the separated slide fastener from the continuous fastener chain may be varied.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the emplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is a perspective view of continuous fastener chain to one tape of which a plurality of flies have been attached in a predetermined series relationship;

FIG. 2 is a perspective view of the fastener chain of FIG. 1, showing the result of processing pursuant to the method and by means of the apparatus of the invention;

FIG. 3 is a fragmentary perspective view to illustrate an application of a slide fastener separated from fastener chain in accordance with the invention in which the slide fastener is associated with a waistband;

FIG. 4 is a fragmentary perspective view illustrating portions of certain apparatus, such as a movable knife and punch assembly, as related to a fixed die, for performing certain severing and fastener elimination functions in accordance with certain aspects of the invention;

FIG. 5 is a detail cross-sectional view, to enlarged scale, substantially on the line 5—5 of FIG. 4, illustrating the position assumed by the continuous fastener chain when fed across the fixed die;

FIG. 6 is a view similar to but of only a portion of FIG. 5, and showing the operating parts of the knife and punch assembly moved to their lowest position;

FIG. 7 is a detail vertical cross-sectional view on line 7—7 of FIG. 6, parts being broken away to illustrate structural details;

FIG. 8 is a detail vertical cross-sectional view of a portion of the arrangement of FIG. 6, as seen from the line 8—8;

FIG. 9 is a fragmentary plan view of a portion of the fastener chain as it appears subsequent to the severing and punching operation illustrated in FIG. 6;

FIG. 10 is a transverse cross-sectional view on line 10—10 of FIG. 9, a severed leg of an element being shown falling away from the tape;

FIG. 11 is a front view in perspective of the severing and punching apparatus of the invention, as seen from the front of the apparatus;

FIG. 12 is a front elevational view of the apparatus to larger scale, illustrating the movable knife and punch assembly in elevated position;

FIG. 13 is a side elevational view of the apparatus shown in FIG. 12;

FIG. 14 is a top plan view of the apparatus shown in FIG. 13;

FIG. 15 is a vertical cross-sectional view, on line 15—15 of FIG. 13, the knife and punch assembly being shown in the lowered position;

FIG. 16 is a transverse cross-sectional view on line 16—16 of FIG. 15;

FIG. 17 is a transverse cross-sectional view on line 17—17 of FIG. 15; and

FIG. 18 is a transverse cross-sectional view on line 18—18 of FIG. 16.

Referring to the drawings, in FIG. 1 is illustrated a length 10 of continuous fastener chain which is made in any suitable manner, by applying fastener elements or scoops 12 in regular, uninterrupted succession along the edge 14 of slide fastener tape 16. In one specific process for which the apparatus to be described has utility, flies 18 for trousers may be secured to a tape of length 10, by suitable means, as, for instance, by stitching 20 (FIG. 5). Fastener chain may be made by interlocking the fastener elements 12 of a pair of stringers 22 and 24. Flies 18, to be secured to length 10, may be of any desired construction, as, for instance, the doubled-over construction shown (FIG. 5) which may have a straight top edge 26 and a terminal curved portion 28. The fastener chain, with the attached flies, is intended to be converted, pursuant to the method and apparatus herein to be described, into individual lengths 30 of fastener chain each with an attached fly, ready for attachment to and assembly into a garment.

Each individual length 30, as finally worked, may be substantially coextensive with its attached fly 18; in some cases there may be differences in these lengths. Each length 30 then includes stringer sections 32 and 34 having their elements 12 interlocked. As a part of the process, a series of fastener elements are removed to provide a gap 36 spaced from the top edge 38 of the individual chain length; at the bottom end of each length 30, a series of fastener elements have been removed to leave an opening 40 extending inwardly from the free bottom edge 42 of length 30. A group of fastener elements 44, left intact between gap 36 and top edge 38, serves to hold stringer sections 32 and 34 together during the operations of securing length 30 together with waistband 46 by means such as stitching 48 which is intended to pass across gap 36.

In order to produce individual lengths 30, apparatus 50 may be utilized. Such apparatus may include a punch and knife assembly 52 which is vertically reciprocable with relation to a fixed die 54. Assembly 52 may comprise a knife 56 and a punch 58 which are held together to move as a single unit, and are shown disposed at right angles to each other. Knife 56 may have any suitable cutting edge; a bevelled cutting edge 60 is shown, and is adapted to sever tape 16 at the predetermined position, as, for instance, at or adjacent to the free end edges of the flies either simultaneously with or immediately at the time of the removal of elements 12 by punch 58.

Punch 58 may be constructed to provide separated cutting faces 62 and 64 at the lower boundary of the punch. These faces are separated from each other by a relief or cutout 66. As shown (FIG. 5), when elements 12 of a pair of stringers are intermeshed, there is a substantially uniform distance between the outer end edges 14 of the two tapes bearing the interlocked elements. Punch 58 preferably has a thickness which corresponds in its dimension with the distance between the spaced edges 14 of the interlocked stringers. Face 62 is provided to cut away elements 12 at the position where gap 36 is to be produced. Face 64 is provided to cut away elements 12 at the position where opening 40 is to be produced. The extent of relief 66 is intended to correspond with the extent of the series of interlocked elements 44 left intact between the cut away elements, so as to provide a group to be interlocked at the top end of each individual length 30.

Fixed die 54 may have a longitudinal slot 68 extending through the die in position to cooperate with punch 58 when assembly 52 is reciprocated downwardly. Upstanding from top face 70 of the fixed die, and laterally spaced from and parallel to slot 68, are a pair of rails 72. Between the rails is provided a channel 74 in which the interlocked elements, as shown in FIGS. 5 and 6, may move. Rails 72 are interrupted, as at 76, in order to permit knife 56 to cooperate with face 70 when the knife is carried down by assembly 52 for the severing operation.

Length 10 may be fed along face 70 with interlocked elements 12 disposed in channel 74 to bring a line of severance 78 between an adjacent pair of end edges of an adjacent pair of flies into position beneath cutting edge 60. With lengths 10 brought to a halt, the tape-severing and element-removing operations are effected by reciprocation of the assembly from the raised position of FIGS. 4 and 5 down to the lowered position of FIGS. 6 to 8, and into engagement with the tape and the interlocked elements of length 10. The severing of the tapes and the removal of the interlocked elements 12 are effected as a part of a single downward stroke of assembly 52. In the apparatus here shown, edge 60 directly cooperates with face 70. The apparatus is related so that faces 62 and 64 have completed their movement into slot 68 and have cut away the required elements 12 before knife edge 60 finally engages the tape and severs it.

Faces 62 and 64, by reason of the thickness of punch 58, are effective to sever elements 12 along lines substantially coincident with the very end faces of edges 14. The severing operation cuts each element into two parts 80 and 82. Parts 80 are pushed downwardly and drop through slot 68. Parts 82 remain, but because of the line of severance, constitute loose pieces which move along a short distance with the tape, but fall off (FIG. 10) the tape, as waste. Faces 62 and 64 thus are effective to form gap 36 and opening 40, respectively. Subsequent to the action of faces 62 and 64, edge 60 engages against tapes 16 and severs them along line 78 (FIGS. 6-8) to form lengths 30, edge 60 cooperating with face 70.

As shown in FIG. 4, knife 56 is mounted in association with punch 58 so that the knife extends transversely of the body of the punch. Also, knife 56 is so located that edge 60 is within the boundaries of the portion of punch 58 which provides face 64 (FIG. 7). Thus face 64 will have cleared out elements 12 at the position where edge 60 is to engage the tape and press it against die 54. After edge 60 has effected its cut, assembly 52 is raised to its initial position, to complete the cycle of operation. The length of chain is advanced, elements 12 being guided by channel 74, and the steps are repeated to produce further individual lengths 30.

Apparatus 50 (FIGS. 11 to 18) may be assembled with a suitable press 84. Die 54 is positioned upon a bed 86; punch and knife assembly 52 are assembled to be operated by a vertically reciprocable ram 88 forming a part of the press. Apparatus 50 may include a stationary housing 90 which may be constituted by a die housing 92, an end wall 94, and guide housing sections 96 and 98. Die housing 92, end wall 94 and sections 96 and 98 may be secured together to define a unitary structure. Apparatus 50 also includes punch knife assembly 52 with its knife 56 and punch 58. Screws 100 serve to secure housing 92 and end wall 94 to bed 86. Housing 92 is formed with a recess 102 into which die 54 is snugly fitted, and then is held secured therein by means of screws 104 received in countersunk holes 106 in housing 92 and engaging threaded holes in die 54. Bolts 108 serve to anchor die housing 92 to end wall 94.

Section 96 is provided with a machined recess 110 forming shoulders 112 between which are snugly received a machined end face 114 and side faces 116 of end wall 94. In turn, sections 96 and 98 have machined faces 118 and 120 to be positioned in abutment. Section 98 is provided with a recess 122 of which its face 120 forms a part; into that recess the part of section 96 having face 118 is fitted. Wall 94 is provided with countersunk holes 124. Aligned holes 126 are provided in section 96. Threaded passages 128 are provided in section 98. Bolts 130 are extended through holes 124 and 126 to engage threads in passages 128 to anchor end wall 94 and sections 96 and 98 to each other in the assembled relation.

Wall 94 is provided with what amounts to a machined recess 132, providing shoulders 134 between which section 96 at its recess 110 is seated. In this manner, all of the parts are held firmly secured in place, and prevented from lateral displacement.

Sections 96 and 98, at their upper ends, are formed with large recesses 136 and 138 which combine, when the sections are held assembled, to form a guideway or cavity 139. Into this guideway is received a block or head 140, which snugly interfits with, and is slidable in the guideway. Block 140 may be secured to or be held in operative engagement with ram 88 to be reciprocated thereby. In the lower end of block 140 there may be provided a pair of recesses 142 and 144. Compression springs 146 and 148, which rest on bottom wall 150 of cavity 139, are received in recesses 142 and 144, respectively, and serve to force block 140, and the parts carried thereby, to raised position, subsequent to a down stroke, and to maintain block 140 in driving contact with ram 88. Springs 146 and 148 are of different sizes owing to space limitations at the opposite sides of punch 58 because of the inclusion of a spacer 152 for holding punch 58 in a slot 154.

Block 140 may be formed with a central slot recess 154 into which punch 58 is detachably mounted. Also fitted into recess 154 is spacer 152. Block 140 may be provided with an aperture 156; spacer 152 has an opening 158; an opening 160 is provided in punch 58; a threaded recess 162 is formed in block 140 in alignment with aperture 156. Screw 164 is positioned in aperture 156, is extended through openings 158 and 160, and is threadedly engaged in recess 162 to clamp punch 58 in slot 154. The head of screw 164 bears against spacer 152 which then distributes the clamping force of screw 164 over a relatively large area of punch 58. At faces 118 and 120 of sections 96 and 98 are provided recesses 166 and 168 for receiving punch 58 so that the punch may slide smoothly in recesses 166 and 168 on vertical reciprocation of assembly 52.

Knife 56 is formed of two sections 170 and 172 which are secured to block 140 by screws 174. Block 140 is undercut at 176 to receive knife sections 170 and 172 snugly. The knife sections abut against punch 58 and are aligned with each other and at right angles to punch 58. Top edges 178 of knife sections 170 and 172 are disposed to engage with a shoulder 180 provided on block 140 so that the shearing forces are not transmitted to the knife sections through screws 174, but the transmission of forces to the knife sections is effected over a large area. Sections 96 and 98 are formed with recesses 182 and 184 for clearance for screws 174. Recesses are provided in sections 96 and 98 for the requisite clearance for the knife sections in their vertical reciprocation with assembly 52.

Slot 68 in die 54 is disposed for registry with slots 186 and 188 in bed 86 and die housing 92, respectively. Pieces 80 are provided passage through slots 186 and 188 when severed by punch 58 and pushed into slot 68.

Punch 58 is detachably mounted in position, and is interchangeable with the other punches having faces 62 and 64 of different length, with reliefs 66 of differing dimensions, within the range of slot 68. In this manner, the extent and relative disposition of gap 36 and opening 40 may be changed by using a punch 58 having faces 62 and 64 of different lengths and with a relief 66 of different position and extent, according to the gaps and openings desired.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. Apparatus for punching out interlocked fastener elements from continuous fastener chain and for severing the tapes of the chain in the same operation, the chain comprising a pair of tapes, with interlockable slide fastener elements mounted on an edge of each tape, and the elements on the edges of the two tapes being opposed and interlocked, the apparatus comprising a housing, a punch assembly vertically reciprocable in the housing, the punch assembly comprising a die punch and a tape severing means, the die punch and the severing means being disposed substantially fixedly at right angles to each other and with the cutting edge of the severing means and the lower edge of the die punch in vertically spaced relation, the severing means being disposed on opposite sides of and at a position intermediate the ends of the die punch, said lower edge having effective punch faces disposed on opposite sides of the severing means, and a companion die, the die and the punch assembly being disposed for relative movement with relation to each other, said die providing means for supporting and guiding fastener chain and having a slot, the punch and the slot being formed for interfitting engagement on reciprocation of the assembly in the housing, said supporting and guiding means including a channel for the reception of said interlocked fastener elements, said die slot extending to said supporting and guiding means and communicating with said channel, said assembly being reciprocable into engagement with interlocked fastener elements in said channel to extend the die punch into said die slot and to engage the severing means against the die for cutting off portions of certain of the interlocked fastener elements and for severing the tapes along a line with said certain interlocked fastener elements on opposite sides of said line, said channel being defined by laterally spaced longitudinally extending abutments upstanding from said supporting surface and paralleling the slot, said abutments having transversely aligned interruptions for clearance for said severing means.

2. Apparatus for punching out interlocked fastener elements from continuous fastener chain and for severing the tapes of the chain in the same operation, the chain comprising a pair of tapes, with interlockable slide fastener elements mounted on an edge of each tape, and the elements on the edges of the two tapes being opposed and interlocked, the apparatus comprising a housing providing right-angularly and vertically disposed slots terminating in a cavity, a head movable in the cavity, a punch assembly vertically reciprocable in the housing, the punch assembly comprising a die punch and a two-member tape severing means disposed and guided by the walls of the slots so that the die punch and the two members of the severing means are disposed substantially fixedly at right angles to each other and with the cutting edges of the two members spaced vertically above the lower edge of the die punch, said lower edge of the die punch being cut away intermediately of its ends to define spaced effective punch faces on opposite sides of the two members, the two members being disposed on opposite sides of and at a position closely adjacent to one of, but intermediate, the ends of one of the effective punch faces, and a companion die, the die and the punch assembly being disposed for relative movement with relation to each other, said die providing means for supporting and guiding the interlocked elements of the fastener chain and having a slot, the die punch and the slot being formed for interfitting engagement on reciprocation of the assembly in the housing, a head having means for engaging the die punch and the two members to drive them downwardly on reciprocation of the assembly to bring the die punch into engagement with chain supported on the die to punch out portions of certain of the interlocked fastener elements and to bring the two members against the tapes to sever them along a line crossing immediately adjacent an end, but between the ends, of the area from which said certain interlocked fastener elements have been punched out, the extent and spacing of the gaps produced by punching out said certain interlocked fastener elements corresponding to the extent of said effective punch faces.

3. Apparatus for punching out interlocked fastener elements from continuous fastener chain and for severing the tapes of the chain in the same operation, the chain comprising a pair of tapes, with interlockable slide fastener elements mounted on an edge of each tape, and the elements on the edges of the two tapes being opposed and interlocked, the apparatus comprising a housing providing right-angularly and vertically disposed slots terminating in a cavity, a head movable in the cavity, the punch assembly comprising a die punch and a two-member tape severing means disposed in and guided by the walls of the slots so that the die punch and the two members of the severing means are disposed substantially fixedly at right angles to each other and with the cutting edges of the two members spaced vertically above the lower edge of the die punch, said lower edge of the die punch being cut away intermediately of its ends to define spaced effective punch faces on opposite sides of the two members, the two members being disposed on opposite sides of and at a position closely adjacent to one of, but intermediate, the ends of one of the effective punch faces, and a companion die, the die and the punch assembly being disposed for relative movement with relation to each other, said die providing means for supporting and guiding the interlocked elements of the fastener chain and having a slot, the die punch and the slot being formed for interfitting engagement on reciprocation of the assembly in the housing, the head having means for engaging the die punch and the two members to drive them downwardly on reciprocation of the assembly to bring the die punch into engagement with chain supported on the die to punch out portions of certain of the interlocked fastener elements and to bring the two members against the tapes to sever them along a line crossing immediately adjacent an end, but between the ends, of the area from which said certain interlocked fastener elements have been punched out, the extent and spacing of the gaps produced by punching out said certain interlocked fastener elements corresponding to the extent of said effective punch faces, and means between the head and the punch for detachable association of the die punch with the head for interchangeable association of different die punches with the severing means to vary the extent and spacing of the gaps and the effective positions of the gaps with relation to the severed ends while maintaining the effective positioning of the members with relation to the end of a gap from which fastener elements have been punched out.

4. Apparatus for punching out interlocked fastener elements from continuous fastener chain and for severing the tapes of the chain in the same operation, the chain comprising a pair of tapes, with interlockable slide fastener elements mounted on an edge of each tape, and the elements on the edges of the two tapes being opposed and interlocked, the apparatus comprising a housing providing right-angularly and vertically disposed slots terminating in a cavity, a head movable in the cavity, a punch assembly vertically reciprocable in the housing, the punch assembly comprising a die punch and a two-member tape severing means disposed in and guided by the walls of the slots so that the die punch and the two members of the severing means are disposed substantially fixedly at right angles to each other and with the cutting edges of the two members spaced vertically above the lower edge of the die punch, said lower edge of the die punch having effective punch faces disposed on opposite sides of the two members, the two members being disposed on opposite sides of and at a position closely adjacent to one of, but intermediate, the ends of one of the effective punch faces, and a companion die, the die and the punch assembly being disposed for relative movement with relation to each other, said die providing means for supporting and guiding the interlocked elements of the fastener chain and having a slot, the die punch and the slot being formed for interfitting engagement on reciprocation of the assembly in the housing, the head having means for engaging the die punch and the two members to drive them downwardly on reciprocation of the assembly to bring the die punch into engagement with chain supported on the die to punch out portions of certain of the interlocked fastener elements and to bring the two members against the tapes to sever them along a line crossing immediately adjacent an end, but between the ends, of the area from which said certain interlocked fastener elements have been punched out, the die punch being seated in the head, means for detachably securing the die punch in the head, the two members being mounted and secured to the head in aligned relation with each other but on opposite sides of and in abutting relation with the side faces of the die punch.

References Cited in the file of this patent
UNITED STATES PATENTS

| | | |
|---|---|---|
| 1,638,526 | Christie | Aug. 9, 1927 |
| 2,708,968 | Soave | May 24, 1955 |
| 2,752,997 | Soave | July 3, 1956 |
| 2,817,403 | Feitl | Dec. 24, 1957 |
| 2,836,239 | Johns | May 27, 1958 |
| 2,838,112 | Feitl | June 10, 1958 |